(12) United States Patent
Rothwell (10) Patent No.: US 12,077,297 B2
(45) Date of Patent: Sep. 3, 2024

(54) SYSTEM AND METHOD FOR AUGMENTED REALITY MOBILE DEVICE TO SELECT AIRCRAFT CABIN DISPLAY AND VIDEO CONTENT FOR AIRCRAFT CABIN

(71) Applicant: Rockwell Collins, Inc., Cedar Rapids, IA (US)

(72) Inventor: Trevis J. Rothwell, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 244 days.

(21) Appl. No.: 17/865,074

(22) Filed: Jul. 14, 2022

(65) Prior Publication Data

US 2024/0017828 A1 Jan. 18, 2024

(51) Int. Cl.
*B64D 11/00* (2006.01)
*G06V 20/59* (2022.01)

(52) U.S. Cl.
CPC .......... *B64D 11/0015* (2013.01); *G06V 20/59* (2022.01)

(58) Field of Classification Search
CPC ..... B64D 11/0015; G06V 20/59; G06F 3/011; G06F 3/0304
See application file for complete search history.

(56) References Cited

U.S. PATENT DOCUMENTS

| 9,607,315 | B1 | 3/2017 | Worley, III |
| 10,768,881 | B2 | 9/2020 | Liu et al. |
| 10,838,677 | B1 | 11/2020 | Webster |
| 2011/0138317 | A1 | 6/2011 | Kang et al. |
| 2014/0282684 | A1 | 9/2014 | Keen et al. |
| 2015/0242179 | A1 | 8/2015 | Benson et al. |
| 2016/0059954 | A1 | 3/2016 | Fagan et al. |
| 2019/0075266 | A1 | 3/2019 | Jeong et al. |
| 2019/0121522 | A1 | 4/2019 | Davis et al. |
| 2019/0212901 | A1 | 7/2019 | Garrison et al. |

(Continued)

FOREIGN PATENT DOCUMENTS

| EP | 3495275 A1 | 9/2022 |
| KR | 20110117496 A | 10/2011 |
| WO | 2020206017 A1 | 10/2020 |

OTHER PUBLICATIONS

Extended European Search Report dated Dec. 19, 2023; European Application No. 23185612.1.

(Continued)

*Primary Examiner* — Alan D Hutchinson
(74) *Attorney, Agent, or Firm* — Suiter Swantz IP (57) ABSTRACT

A system includes an aircraft interface device, displays installed in an aircraft cabin, an LRU, and a mobile device within the aircraft cabin. The mobile device is configured to: capture images of the aircraft cabin; identify at least one display of the at least two displays within the captured images; display an augmented reality view of the captured images including indicator(s) for the at least one display having user-selectable video content options; receive a user selection of a given display of the at least one display, indicative of a selection to control video content for the given display; display a graphical representation of the user-selectable video content options; receive a user option selection of the user-selectable video content options, the user option selection associated with a particular video content option associated with particular video content; and transmit an instruction to display the particular video content on the given display.

17 Claims, 8 Drawing Sheets

(56) References Cited

U.S. PATENT DOCUMENTS

2020/0380792 A1    12/2020   Sivanadian et al.
2021/0048968 A1    2/2021    Araújo et al.

OTHER PUBLICATIONS

NG Alexander et al, "The Passenger Experience of Mixed Reality Virtual Display Layouts in Airplane Environments", 2021 IEEE International Symposium on Mixed and Augmented Reality (ISMAR), IEEE Oct. 4, 2021, pp. 265-274.

SYSTEM AND METHOD FOR AUGMENTED REALITY MOBILE DEVICE TO SELECT AIRCRAFT CABIN DISPLAY AND VIDEO CONTENT FOR AIRCRAFT CABIN

BACKGROUND

Currently, aircraft cabins that include displays have a separate control device to control video content for each display or have a common control device that requires a user to remember how displays are coded (e.g., "Display 1", "Display 2", "Display 3", etc.) on the common control device. Existing aircraft cabins may include a dozen or more displays. Existing video content control for aircraft cabins with multiple displays can be confusing for passengers that do not fly in a particular aircraft cabin often or otherwise lack knowledge of how the multiple displays are controlled. As such, existing solutions lack user friendliness.

SUMMARY

In one aspect, embodiments of the inventive concepts disclosed herein are directed to a system. The system may include an aircraft interface computing device configured to route communications to other computing devices. The system may include at least two displays installed in an aircraft cabin. The system may include a line replaceable unit (LRU) computing device comprising at least one processor and memory, the LRU computing device communicatively coupled to the aircraft interface computing device and, optionally, to the at least two displays. The system may include a mobile computing device within the aircraft cabin, the mobile computing device comprising at least one mobile computing device processor, at least one mobile computing device camera, and a mobile computing device display. The mobile computing device may be configured to: receive a user input to control video content; upon receipt of the user input to control video content, capture images of the aircraft cabin based on user manipulation of a position and an orientation of the mobile computing device within the aircraft cabin; upon capture of the images, identify at least one display of the at least two displays within the captured images, wherein the at least one display has user-selectable video content options; upon identification of the at least one display, display an augmented reality view of the captured images including an indicator for each of the at least one display having the user-selectable video content options; upon displaying of the augmented reality view of the captured images, receive a user selection of a given display of the at least one display, wherein the user selection is indicative of a selection to control video content displayed by the given display; upon receipt of the user selection, display a graphical representation of the user-selectable video content options; upon display of the graphical representation, receive a user option selection of the user-selectable video content options from the user, the user option selection associated with a particular video content option associated with particular video content; and upon receipt of the user option selection, wirelessly transmit an instruction to display the particular video content on the given display. The given display may be configured to display the particular video content.

In a further aspect, embodiments of the inventive concepts disclosed herein are directed to a method. The method may include: providing an aircraft interface computing device configured to route communications to other computing devices; providing at least two displays installed in an aircraft cabin; providing a line replaceable unit (LRU) computing device comprising at least one processor and memory, the LRU computing device communicatively coupled to the aircraft interface computing device and, optionally, to the at least two displays; providing a mobile computing device within the aircraft cabin, the mobile computing device comprising at least one mobile computing device processor, at least one mobile computing device camera, and a mobile computing device display; receiving, by the mobile computing device, a user input to control video content; upon receipt of the user input to control video content, capturing, by the mobile computing device, images of the aircraft cabin based on user manipulation of a position and an orientation of the mobile computing device within the aircraft cabin; upon capture of the images, identifying, by the mobile computing device, at least one display of the at least two displays within the captured images, wherein the at least one display has user-selectable video content options; upon identification of the at least one display, displaying, by the mobile computing device, an augmented reality view of the captured images including an indicator for each of the at least one display having the user-selectable video content options; upon displaying of the augmented reality view of the captured images, receiving, by the mobile computing device, a user selection of a given display of the at least one display, wherein the user selection is indicative of a selection to control video content displayed by the given display; upon receipt of the user selection, displaying, by the mobile computing device, a graphical representation of the user-selectable video content options; upon display of the graphical representation, receiving, by the mobile computing device, a user option selection of the user-selectable video content options from the user, the user option selection associated with a particular video content option associated with particular video content; upon receipt of the user option selection, wirelessly transmitting, by the mobile computing device, an instruction to display the particular video content on the given display; and displaying, by the given display, the particular video content.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method for a mobile computing device (e.g., a tablet computing device, a phone computing device, or a head wearable display computing device) to provide an augmented reality (AR) view of an aircraft cabin to select an aircraft cabin display and video content for the selected aircraft cabin display.

Cabin system customers often have multiple video displays installed, and different video content can be displayed on each display. Some embodiments may include using augmented reality views of the aircraft cabin to control content displayed on one or more aircraft cabin displays. For example, a user may look around the cabin by viewing augmented reality images of the cabin on the user's mobile computing device. As nearby displays come into view, the mobile computing device may be configured to use augmented reality to identify displays and create augmented reality views of the cabin that identify (e.g., highlight or draw a box around the displays) displays that the user can interact with. For example, the user may make a user input (e.g., a user touch input, a user voice input, a user gesture input, or a user eye input) on the mobile computing device to select one or more of the displays, and the mobile computing device may present a graphical representation of user-selectable video content options for the one or more selected displays. For example, once the user selects the video content for the selected display(s), the graphical representation of the user-selectable video content options may be dismissed, and the selected display(s) may display the selected video. The mobile computing device may instruct the system to send video to that selected display to display the selected video content. Some embodiments let the user point their mobile computing device at the display they desire to interact with to select the monitor they are looking at. Additionally, in some embodiments, the user may use a head wearable display computing device (e.g., an AR headset or AR glasses) such that the user does not even need to use their hand(s).

In some embodiments, the system software may provide an administrative interface and an end user interface.

In some embodiments, the administrative interface could be used for configuring an airplane for use, after cabin interior equipment has been installed. Such an administrative interface may be implemented on a mobile computing device configured to wirelessly communicate with other devices on the system (e.g., a line replaceable unit (LRU) computing device, displays, and/or an aircraft interface computing device). For example, using the administrative interface, the user may: capture, via the mobile computing device, a three dimensional (3D) spatial representation of an aircraft cabin interior; identify spatial points in the aircraft cabin interior where there are displays; for each identified spatial point, pair that point with a display entry in the LRU computing device; and/or export, via the mobile computing device, positioning and pairing data to the LRU computing device for end users to retrieve when using the end user interface.

In some embodiments, the end user interface may be used by passengers after the administrative interface has been used to initialize monitor positioning and pairing. Such an end user interface may be implemented on the mobile computing device configured to wirelessly communicate with other devices on the system (e.g., a line replaceable unit (LRU) computing device, displays, and/or an aircraft interface computing device). For example, the end user may: retrieve (e.g., automatically retrieve), via the mobile computing device, the positioning and pairing data created during administrative configuration; be able to point their mobile computing device camera around the aircraft cabin interior and see visual augmented reality indicators (e.g., highlighting or boxes) of displays that the user can interact with; select a display as seen through the mobile computing device and be offered a graphical interface through which the user can select a video source to output to the selected display(s); and/or when the user applies a change or cancels the end user interface, the graphical interface may be dismissed.

Referring now to FIGS. 1-5, an exemplary embodiment of a system 100 according to the inventive concepts disclosed herein is depicted. In some embodiments, the system 100 may include a vehicle (e.g., an aircraft 102, a train, a spacecraft, or an automobile). The aircraft 102 may include at least one user (e.g., passengers, pilots, crew, cabin configurers, and/or equipment installers), at least one display 104 (e.g., displays), at least one aircraft interface computing device 106 (e.g., an aircraft router computing device), at least one LRU computing device 108, at least one mobile computing device 110 (e.g., a tablet computing device, a phone computing device, and/or a head wearable display computing device), some or all of which may be communicatively coupled at any given time. The aircraft 102 may include an aircraft cabin 112 (e.g., a custom aircraft cabin, such as having custom number, custom type, and/or custom positions of displays 104). The aircraft cabin 112 may include some or all of the displays 104 and/or the at least one mobile computing device 110; in some embodiments, the aircraft cabin 112 may include the at least one user, the at least one display 104, the at least one aircraft interface computing device 106, the at least one LRU computing device 108, and/or the at least one mobile computing device 110. In some embodiments, the at least one aircraft interface computing device 106 and the at least one LRU computing device 108, may be implemented as a single computing device or any number of computing devices configured to perform (e.g., collectively perform if more than one computing device) any or all of the operations disclosed throughout.

Figure 2:
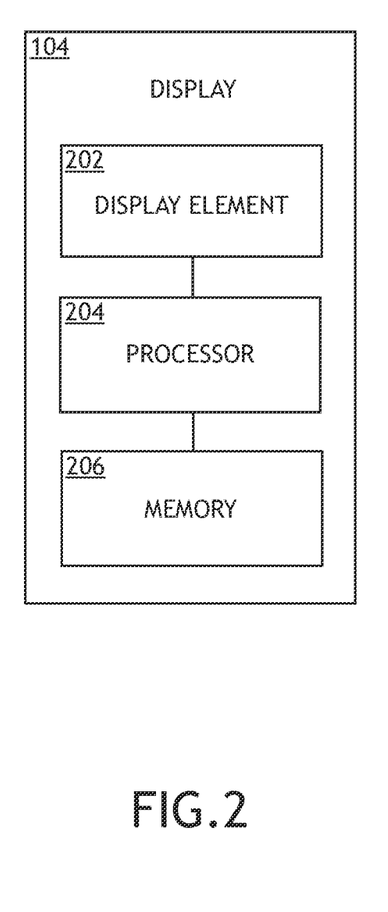
FIG. 2 is a view of an exemplary embodiment of a display of the system of FIG. 1 according to the inventive concepts disclosed herein.

The at least one display 104 may include any number of display(s) installed in the aircraft cabin 112 of the aircraft 102 and may be implemented as any suitable display device(s). Each of the displays 104 may be wiredly and/or wirelessly connected to the aircraft interface computing device 106, the LRU computing device 108, and/or the mobile computing device 110. The displays 104 may each include at least one display element 202, at least one processor 204, and/or memory 206, some or all of which may be communicatively coupled. One or more of the at least one display 104 may be configured to display particular video content associated with a user option selection associated with a particular video content option.

Figure 3:
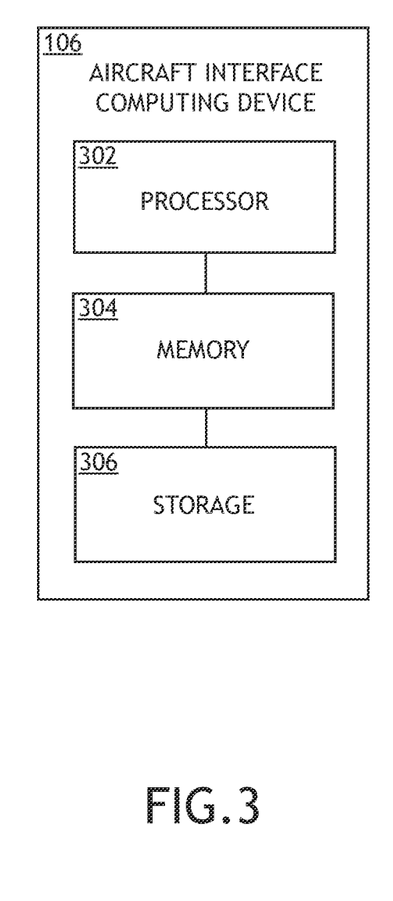
FIG. 3 is a view of an exemplary embodiment of an aircraft interface computing device of the system of FIG. 1 according to the inventive concepts disclosed herein.

The at least one aircraft interface computing device 106 may be implemented as any suitable computing device, such as an aircraft router computing device (e.g., a flight operation and maintenance exchange (FOMAX) computing device or a smart router). The at least one aircraft interface computing device 106 may be configured to route (e.g., wiredly route and/or wirelessly route) communications to other computing devices (e.g., the displays 104, the mobile computing device 110, and/or the LRU computing device 108). The at least one aircraft interface computing device 106 may include any or all of the elements, as shown in FIG. 3. For example, the aircraft interface computing device 106 may include at least one processor 302, at least one memory 304, and/or at least one storage 306, some or all of which may be communicatively coupled at any given time. For example, the at least one processor 302 may include at least one central processing unit (CPU), at least one graphics processing unit (GPU), at least one field-programmable gate array (FPGA), at least one application specific integrated circuit (ASIC), at least one digital signal processor, at least one deep learning processor unit (DPU), at least one virtual machine (VM) running on at least one processor, and/or the like configured to perform (e.g., collectively perform) any of the operations disclosed throughout. For example, the at least one processor 302 may include a CPU and a GPU configured to perform (e.g., collectively perform) any of the operations disclosed throughout. The processor 302 may be configured to run various software applications or computer code stored (e.g., maintained) in a non-transitory computer-readable medium (e.g., memory 304 and/or storage 306) and configured to execute various instructions or operations. The processor 302 of the aircraft computing device 106 may be configured to perform any or all of the operations disclosed throughout.

Figure 4:
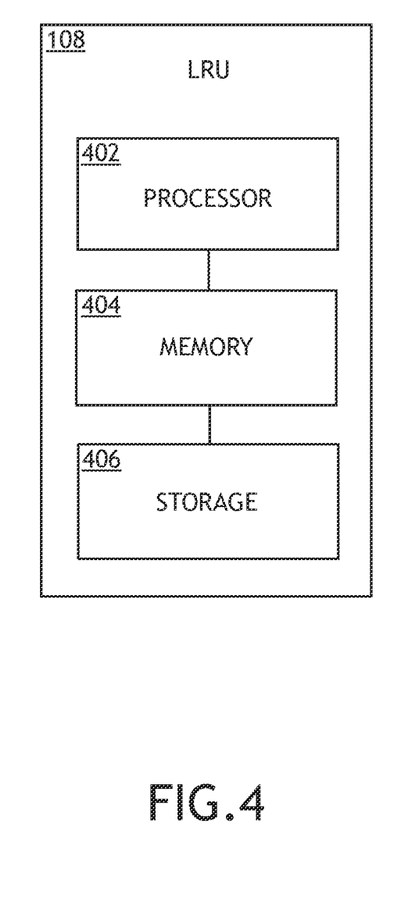
FIG. 4 is a view of an exemplary embodiment of an LRU computing device of the system of FIG. 1 according to the inventive concepts disclosed herein.

The at least one LRU computing device 108 may be implemented as any suitable computing device(s), such as a cabin system computing device configured to control various aspects of the cabin electronic devices. For example, the LRU computing device 108 may be configured to receive, host, and/or output at least some of the user-selectable video content and/or connect (e.g., via a universal serial bus (USB) connection) to a storage device configured to store at least some of the user-selectable video content. For example, the LRU computing device 108 may be configured to control content displayed by the displays 104. For example, the LRU computing device 108 may be configured to host and output various data accessible by the mobile computing device 110. The at least one LRU computing device 108 may include any or all of the elements, as shown in FIG. 4. For example, the LRU computing device 108 may include at least one processor 402, at least one memory 404, and/or at least one storage 406, some or all of which may be communicatively coupled at any given time. For example, the at least one processor 402 may include at least one central processing unit (CPU), at least one graphics processing unit (GPU), at least one field-programmable gate array (FPGA), at least one application specific integrated circuit (ASIC), at least one digital signal processor, at least one deep learning processor unit (DPU), at least one virtual machine (VM) running on at least one processor, and/or the like configured to perform (e.g., collectively perform) any of the operations disclosed throughout. For example, the at least one processor 402 may include a CPU and a GPU configured to perform (e.g., collectively perform) any of the operations disclosed throughout. The processor 402 may be configured to run various software applications or computer code stored (e.g., maintained) in a non-transitory computer-readable medium (e.g., memory 404 and/or storage 406) and configured to execute various instructions or operations. The at least one processor 402 of the LRU computing device 108 may be configured to perform (e.g., collectively perform) any or all of the operations disclosed throughout.

For example, the at least one LRU computing device 108 may be configured to perform (e.g., collectively perform if more than one LRU computing device 108) any or all of the following: store mapped data associated with a connection between the LRU computing device 108 and the one (e.g., 104-1) of the at least one display 104 (e.g., 104-1) for each of spatial points within an interior of the aircraft cabin 112, each of the spatial points corresponding to one (e.g., 104-1) of the at least one display 104 (e.g., 104-1) having the user-selectable video content options, wherein the mobile computing device 110 is further configured to: retrieve the mapped data from the LRU computing device 108.

Figure 1:
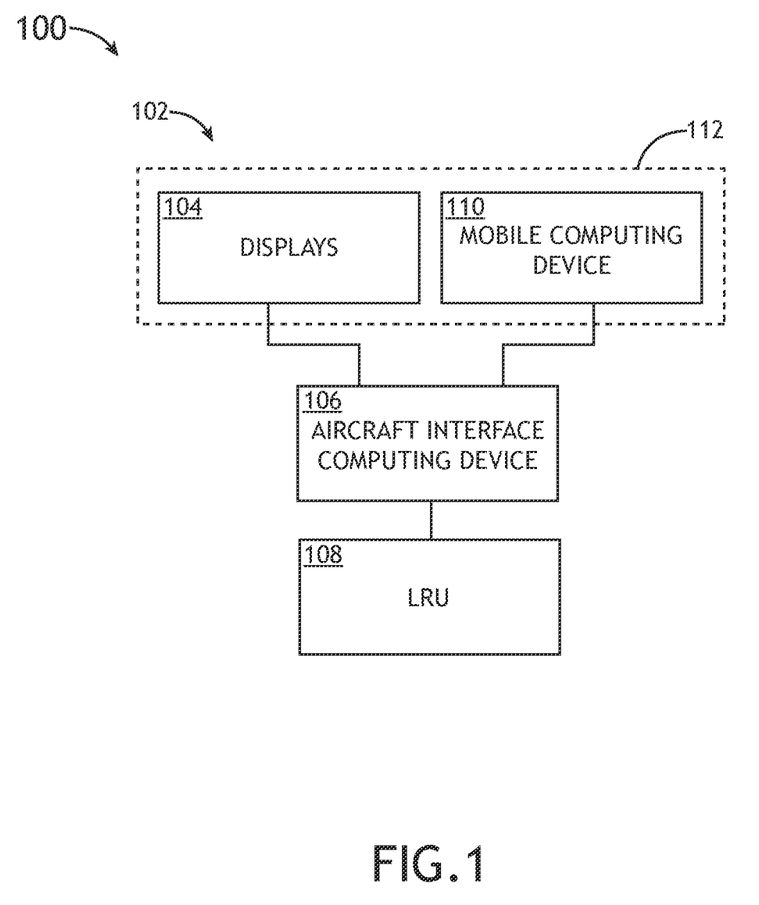
FIG. 1 is a view of an exemplary embodiment of a system according to the inventive concepts disclosed herein.

The at least one mobile computing device 110 may be within the aircraft cabin 112. The at least one mobile computing device 110 may be implemented as any suitable computing device(s), such as at least one tablet computing device, at least one phone computing device, and/or at least one head wearable display computing device. The at least one mobile computing device 110 may be wiredly and/or wirelessly communicatively coupled to at least one of the LRU computing device 108, the aircraft interface computing device 106, and/or the displays 104 at any given time.

Figure 5:
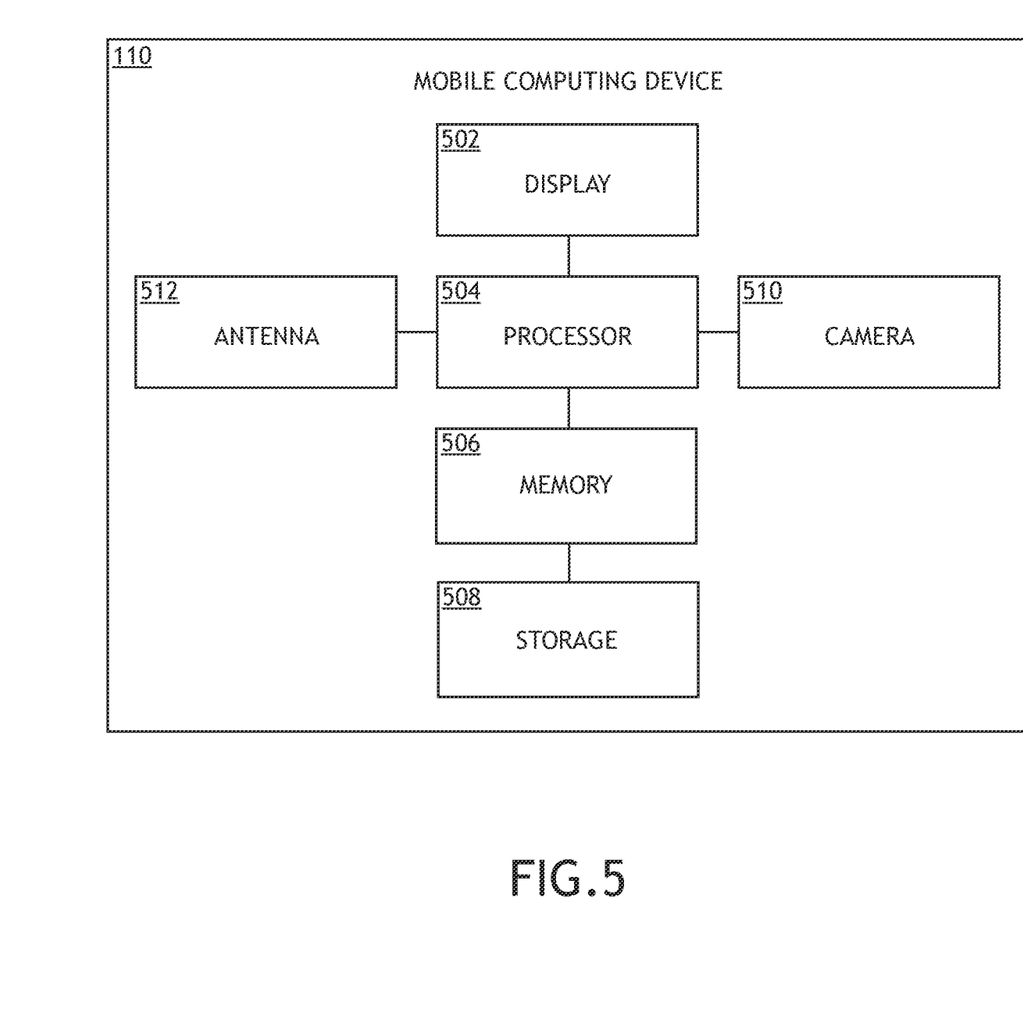
FIG. 5 is a view of an exemplary embodiment of a mobile computing device of the system of FIG. 1 according to the inventive concepts disclosed herein.

The at least one mobile computing device 110 may include any or all of the elements, as shown in FIG. 5. For example, the LRU mobile computing device 110 may include at least one display 502, at least one processor 504, at least one memory 506, at least one storage 508, at least one camera 510, and/or at least one antenna, some or all of which may be communicatively coupled at any given time. For example, the at least one processor 504 may include at least one central processing unit (CPU), at least one graphics processing unit (GPU), at least one field-programmable gate array (FPGA), at least one application specific integrated circuit (ASIC), at least one digital signal processor, at least one deep learning processor unit (DPU), at least one virtual machine (VM) running on at least one processor, and/or the like configured to perform (e.g., collectively perform) any of the operations disclosed throughout. For example, the at least one processor 504 may include a CPU and a GPU configured to perform (e.g., collectively perform) any of the operations disclosed throughout. The processor 504 may be configured to run various software applications or computer code stored (e.g., maintained) in a non-transitory computer-readable medium (e.g., memory 506 and/or storage 508) and configured to execute various instructions or operations. The at least one processor 504 of the mobile computing device 110 may be configured to perform (e.g., collectively perform) any or all of the operations disclosed throughout.

For example, the at least one mobile computing device 110 may be configured to perform (e.g., collectively perform if more than one mobile computing device 110) any or all of the following: receive a user input to control video content; upon receipt of the user input to control video content, capture images of the aircraft cabin 112 based on user manipulation of a position and an orientation of the mobile computing device 110 within the aircraft cabin 112; upon capture of the images, identify at least one display 104 (e.g., see also 104-1 in FIG. 6) of the at least two displays 104 within the captured images, wherein the at least one display 104 (e.g., 104-1 in FIG. 6) has user-selectable video content options; upon identification of the at least one display 104 (e.g., 104-1), display an augmented reality view of the captured images including an indicator (e.g., 602 in FIG. 6) for each of the at least one display 104 (e.g., 104-1) having the user-selectable video content options; upon displaying of the augmented reality view of the captured images, receive a user selection of a given display 104 (e.g., one of 104-1) of the at least one display 104 (e.g., 104-1), wherein the user selection is indicative of a selection to control video content displayed by the given display 104 (e.g., one of 104-1); upon receipt of the user selection, display a graphical representation of the user-selectable video content options; upon display of the graphical representation, receive a user option selection of the user-selectable video content options from the user, the user option selection associated with a particular video content option associated with particular video content; and/or upon receipt of the user option selection, wirelessly transmit an instruction to display the particular video content on the given display 104 (e.g., one of 104-1).

Figure 6:
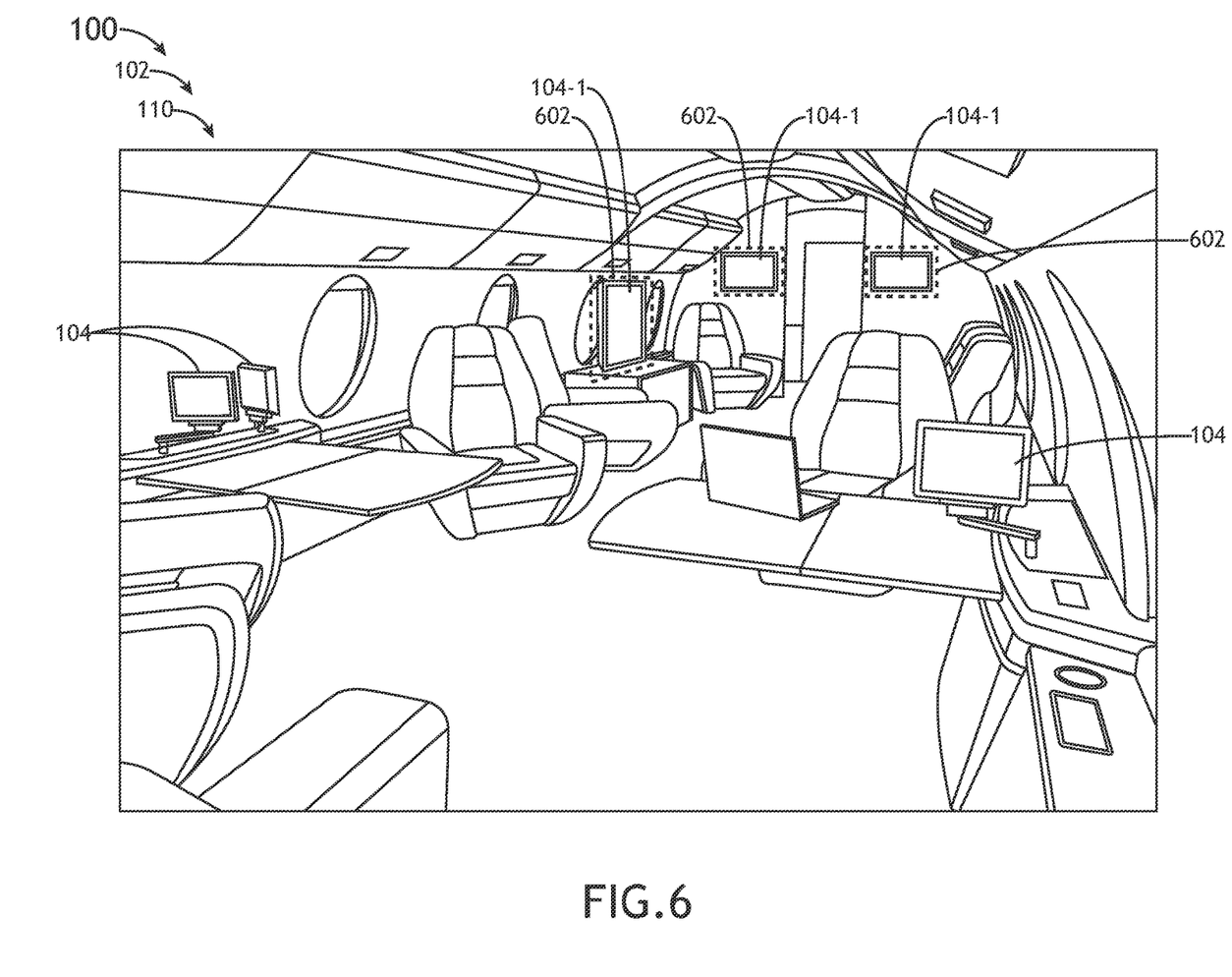
FIG. 6 is an exemplary embodiment of a view of an augmented reality view of the captured images including an indicator for each of the at least one display having the user-selectable video content options of the system of FIG. 1 according to the inventive concepts disclosed herein.

In some embodiments, the at least one mobile computing device 110 may be further configured to perform (e.g., collectively perform if more than one mobile computing device 110) any or all of the following: pair with the LRU computing device 108 and with the at least one display. In some embodiments, the at least one mobile computing device 110 may be configured to perform (e.g., collectively perform if more than one mobile computing device 110) any or all of the following: capture a three-dimensional (3D) representation of an interior of the aircraft cabin 112; identify spatial points within the representation of the interior such that each of the spatial points corresponds to one (e.g., 104-1) of the at least one display 104 (e.g., 104-1) having the user-selectable video content options; for each of the spatial points, pair said spatial point with the one (e.g., 104-1) of the at least one display 104 (e.g., 104-1); output data associated with the spatial points and the at least one display 104 (e.g., 104-1) to the LRU computing device 108 such that the LRU computing device 108 is configured to map said spatial point with the one (e.g., 104-1) of the at least one display 104 (e.g., 104-1) and such that the LRU computing device 108 is configured to store mapped data associated with a connection between the LRU computing device and the one (e.g., 104-1) of the at least one display 104 (e.g., 104-1) for each of the spatial points; and/or retrieve the mapped data from the LRU computing device 108.

In some embodiments, the at least one mobile computing device 110 may be further configured to perform (e.g., collectively perform if more than one mobile computing device 110) any or all of the following: upon capture of the images, use machine vision to identify at least one display 104 (e.g., 104-1) of the at least two displays 104 within the captured images.

In some embodiments, the at least one mobile computing device 110 may be further configured to perform (e.g., collectively perform if more than one mobile computing device 110) any or all of the following: upon capture of the images, identify at least one display 104 (e.g., 104-1) of the at least two displays 104 within the captured images based at least on user inputs in reference to at least one point in the captured images.

Referring now to FIG. 6, an exemplary embodiment of a view of an augmented reality view of the captured images including an indicator (e.g., 602 in FIG. 6) for each of the at least one display 104 (e.g., 104-1) having the user-selectable video content options of the system 100 of FIG. 1 according to the inventive concepts disclosed herein is depicted. In some embodiments, the system 100 may include a vehicle (e.g., an aircraft 102, a train, a spacecraft, or an automobile). Each indicator 602 may be any suitable graphical indicator that indicates a location of one of the at least one display 104 (e.g., 104-1) having the user-selectable video content options. For example, each of the indicators 602 may be implemented as a colored box around one of the at least one display 104 (e.g., 104-1), may highlight one of the at least one display 104 (e.g., 104-1), and/or may include an arrow pointing to one of the at least one display 104 (e.g., 104-1).

Figure 7:
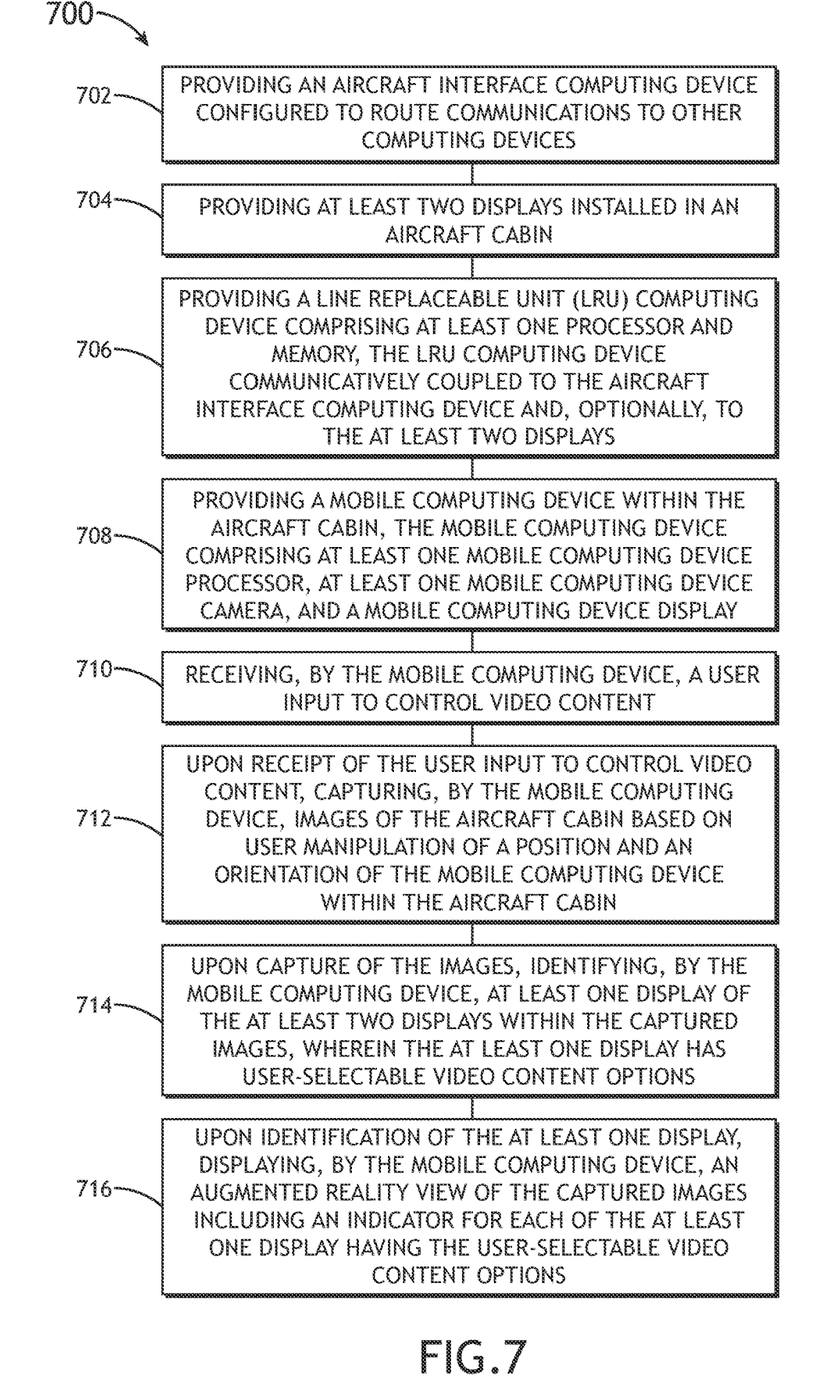
FIG. 7 is a diagram of an exemplary embodiment of a method according to the inventive concepts disclosed herein.

Referring now to FIG. 7, an exemplary embodiment of a method 700 according to the inventive concepts disclosed herein may include one or more of the following steps. Additionally, for example, some embodiments may include performing one or more instances of the method 700 iteratively, concurrently, and/or sequentially. Additionally, for example, at least some of the steps of the method 700 may be performed in parallel and/or concurrently. Additionally, in some embodiments, at least some of the steps of the method 700 may be performed non-sequentially.

A step 702 may include providing an aircraft interface computing device configured to route communications to other computing devices.

A step 704 may include providing at least two displays installed in an aircraft cabin.

A step 706 may include providing a line replaceable unit (LRU) computing device comprising at least one processor and memory, the LRU computing device communicatively coupled to the aircraft interface computing device and, optionally, to the at least two displays.

A step 708 may include providing a mobile computing device within the aircraft cabin, the mobile computing device comprising at least one mobile computing device processor, at least one mobile computing device camera, and a mobile computing device display.

A step 710 may include receiving, by the mobile computing device, a user input to control video content.

A step 712 may include upon receipt of the user input to control video content, capturing, by the mobile computing device, images of the aircraft cabin based on user manipulation of a position and an orientation of the mobile computing device within the aircraft cabin.

A step 714 may include upon capture of the images, identifying, by the mobile computing device, at least one display of the at least two displays within the captured images, wherein the at least one display has user-selectable video content options.

A step 716 may include upon identification of the at least one display, displaying, by the mobile computing device, an augmented reality view of the captured images including an indicator for each of the at least one display having the user-selectable video content options.

A step 718 may include upon displaying of the augmented reality view of the captured images, receiving, by the mobile computing device, a user selection of a given display of the at least one display, wherein the user selection is indicative of a selection to control video content displayed by the given display.

A step 720 may include upon receipt of the user selection, displaying, by the mobile computing device, a graphical representation of the user-selectable video content options.

A step 722 may include upon display of the graphical representation, receiving, by the mobile computing device, a user option selection of the user-selectable video content options from the user, the user option selection associated with a particular video content option associated with particular video content.

A step 724 may include upon receipt of the user option selection, wirelessly transmitting, by the mobile computing device, an instruction to display the particular video content on the given display.

A step 726 may include displaying, by the given display, the particular video content.

Further, the method 700 may include any of the operations disclosed throughout.

As will be appreciated from the above, embodiments of the inventive concepts disclosed herein may be directed to a system and a method for a mobile computing device to provide an augmented reality view of an aircraft cabin to select an aircraft cabin display and video content for the selected aircraft cabin display.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
an aircraft interface computing device configured to route communications to other computing devices;
at least two displays installed in an aircraft cabin;
a line replaceable unit (LRU) computing device comprising at least one processor and memory, the LRU computing device communicatively coupled to the aircraft interface computing device and, optionally, to the at least two displays; and
a mobile computing device within the aircraft cabin, the mobile computing device comprising at least one mobile computing device processor, at least one mobile computing device camera, and a mobile computing device display, wherein the mobile computing device is configured to:
receive a user input to control video content;
upon receipt of the user input to control video content, capture images of the aircraft cabin based on user manipulation of a position and an orientation of the mobile computing device within the aircraft cabin;
upon capture of the images, identify at least one display of the at least two displays within the captured images, wherein the at least one display has user-selectable video content options;
upon identification of the at least one display, display an augmented reality view of the captured images including an indicator for each of the at least one display having the user-selectable video content options;
upon displaying of the augmented reality view of the captured images, receive a user selection of a given display of the at least one display, wherein the user selection is indicative of a selection to control video content displayed by the given display;
upon receipt of the user selection, display a graphical representation of the user-selectable video content options;
upon display of the graphical representation, receive a user option selection of the user-selectable video content options from the user, the user option selection associated with a particular video content option associated with particular video content; and
upon receipt of the user option selection, wirelessly transmit an instruction to display the particular video content on the given display;
wherein the given display is configured to display the particular video content.

2. The system of claim 1, wherein the mobile computing device is configured to pair with the LRU computing device and with the at least one display.

3. The system of claim 2, wherein the aircraft cabin is a custom aircraft cabin.

4. The system of claim 2, wherein the mobile computing device being configured to pair with the LRU computing device further comprises the mobile computing device being further configured to: capture a three-dimensional (3D) representation of an interior of the aircraft cabin; identify spatial points within the representation of the interior such that each of the spatial points corresponds to one of the at least one display having the user-selectable video content options; for each of the spatial points, pair said spatial point with the one of the at least one display; and output data associated with the spatial points and the at least one display to the LRU computing device such that the LRU computing device is configured to map said spatial point with the one of the at least one display and such that the LRU computing device is configured to store mapped data associated with a connection between the LRU computing device and the one of the at least one display for each of the spatial points.

5. The system of claim 4, wherein the mobile computing device is further configured to: retrieve the mapped data from the LRU computing device.

6. The system of claim 1, the LRU computing device is configured to store mapped data associated with a connection between the LRU computing device and the one of the at least one display for each of spatial points within an interior of the aircraft cabin, each of the spatial points corresponding to one of the at least one display having the user-selectable video content options, wherein the mobile computing device is further configured to: retrieve the mapped data from the LRU computing device.

7. The system of claim 1, wherein the mobile computing device being configured to upon capture of the images, identify the at least one display of the at least two displays within the captured images further comprises the mobile computing device being further configured to upon capture of the images, use machine vision to identify at least one display of the at least two displays within the captured images.

8. The system of claim 1, wherein the mobile computing device being configured to upon capture of the images, identify the at least one display of the at least two displays within the captured images further comprises the mobile computing device being further configured to upon capture of the images, identify at least one display of the at least two displays within the captured images based at least on user inputs in reference to at least one point in the captured images.

9. The system of claim 1, further comprising a storage device connected to the LRU computing device, wherein the storage device is configured to store at least some of the user-selectable video content.

10. The system of claim 1, wherein the mobile computing device is a tablet computing device.

11. The system of claim 1, wherein the mobile computing device is a phone computing device.

12. The system of claim 1, wherein the mobile computing device is a head wearable display computing device.

13. The system of claim 1, wherein the mobile computing device is wirelessly connected to the aircraft interface computing device.

14. The system of claim 13, wherein the at least two displays are at least wirelessly connected to the aircraft interface computing device.

15. The system of claim 13, wherein the at least two displays are at least wiredly connected to at least one of the aircraft interface computing device or the LRU computing device.

16. The system of claim 1, wherein the at least one display is two or more displays of the at least two displays.

17. A method, comprising:
providing an aircraft interface computing device configured to route communications to other computing devices;
providing at least two displays installed in an aircraft cabin;
providing a line replaceable unit (LRU) computing device comprising at least one processor and memory, the LRU computing device communicatively coupled to the aircraft interface computing device and, optionally, to the at least two displays;
providing a mobile computing device within the aircraft cabin, the mobile computing device comprising at least one mobile computing device processor, at least one mobile computing device camera, and a mobile computing device display;

receiving, by the mobile computing device, a user input to control video content;

upon receipt of the user input to control video content, capturing, by the mobile computing device, images of the aircraft cabin based on user manipulation of a position and an orientation of the mobile computing device within the aircraft cabin;

upon capture of the images, identifying, by the mobile computing device, at least one display of the at least two displays within the captured images, wherein the at least one display has user-selectable video content options;

upon identification of the at least one display, displaying, by the mobile computing device, an augmented reality view of the captured images including an indicator for each of the at least one display having the user-selectable video content options;

upon displaying of the augmented reality view of the captured images, receiving, by the mobile computing device, a user selection of a given display of the at least one display, wherein the user selection is indicative of a selection to control video content displayed by the given display;

upon receipt of the user selection, displaying, by the mobile computing device, a graphical representation of the user-selectable video content options;

upon display of the graphical representation, receiving, by the mobile computing device, a user option selection of the user-selectable video content options from the user, the user option selection associated with a particular video content option associated with particular video content;

upon receipt of the user option selection, wirelessly transmitting, by the mobile computing device, an instruction to display the particular video content on the given display; and displaying, by the given display, the particular video content.

* * * * *